United States Patent

Crawford et al.

Patent Number: 5,887,044
Date of Patent: Mar. 23, 1999

[54] FUEL ELEMENT DESIGN FOR THE ENHANCED DESTRUCTION OF PLUTONIUM IN A NUCLEAR REACTOR

[75] Inventors: Douglas C. Crawford; Douglas L. Porter; Steven L. Hayes, all of Idaho Falls, Id.; Robert N. Hill, Bolingbrook, Ill.

[73] Assignee: The United States of America as respresented by the United States Department of Energy, Washington, D.C.

[21] Appl. No.: 922,019

[22] Filed: Sep. 2, 1997

[51] Int. Cl.[6] ................................ G21C 3/00; G21C 3/06
[52] U.S. Cl. .................... 376/409; 376/416; 376/412; 376/457
[58] Field of Search ...................... 376/409, 412, 376/414, 416, 431, 457; 420/2, 422; 148/672

[56] References Cited

PUBLICATIONS

"Physics Studies of Weapons Plutonium Disposition in the Integral Fast Reactor Closed Fuel Cycle," 1995—R. N. Hill et al.

"Physics of Higher Actinide Consumption in an LMR", Hill, et. al, Feb. 20, 1990.

"Evaluation of Reactivity Coefficients for Transuranic Burning Fast–Reactor Designs", Hill, et al.

"Plutonium Dispostion Study", May 1993.

"Metallic Fast Reactor Fuels", Hofman, et al.

"Fuel Constituent Redistribution during the Early Stages of U–Pu–Zr Irradiation", Porter, et al., Jul., 1990.

"Prish, A Safe, Economic and Testable Loquid Metal Fast Breeder Reactor Plant", Berglund, et al., May 1988.

"Chemical Basis for Pyrochemical Reprocessing of Nuclear Fuel", Ackerman, 1991.

*Primary Examiner*—Charles T. Jordan
*Assistant Examiner*—Matthew J. Lattig
*Attorney, Agent, or Firm*—Bradley W. Smith; Mark P. Dvorscak; Wiliam R. Moser

[57] ABSTRACT

A uranium-free fuel for a fast nuclear reactor comprising an alloy of Pu, Zr and Hf, wherein Hf is present in an amount less than about 10% by weight of the alloy. The fuel may be in the form of a Pu alloy surrounded by a Zr—Hf alloy or an alloy of Pu—Zr—Hf or a combination of both.

13 Claims, 7 Drawing Sheets

5,887,044

FUEL ELEMENT DESIGN FOR THE ENHANCED DESTRUCTION OF PLUTONIUM IN A NUCLEAR REACTOR

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

The secure and timely disposal of transuranic materials (primarily plutonium) has been the subject of intense debate in recent years. The two primary sources of transuranics are disassembled nuclear weapons and spent fuel from existing power reactors.

Large quantities of weapons-grade plutonium currently exist in U.S. and C.I.S. weapons stockpiles which are to be dismantled in accordance with current arms reduction treaties. This material must be closely safeguarded to prevent its diversion for use in nuclear weapons. The weapons-grade material can be quickly put into a form which is not readily usable for nuclear weapons by diluting the material and introducing radioactivity, thus rendering it difficult to handle. However, this short-term "disposal" of weapons material does not remove the long-term proliferation risk, and such denatured material requires perpetual active safeguarding. Therefore, the only enduring solution is to actively safeguard the denatured weapons material in the short-term and eventually destroy the material.

Even larger quantities of transuranics are contained in the spent fuel inventories of existing nuclear reactors. This material does not pose an immediate proliferation concern because it already exists in a dilute (transuranics constitute about 1% of the total heavy metal mass) and radioactive form. The current U.S. waste management strategy calls for direct disposal of the LWR spent fuel in a centralized repository. However, direct disposal of LWR spent fuel in a centralized repository is complicated by the presence of the transuranics, which dominate the long-term radiotoxicity of LWR spent fuel. Thus, from a waste management perspective it is desirable to process the LWR spent fuel to remove the transuranics and process the remaining waste material into a more stable form. Subsequent destruction of the separated transuranic material reduces its long-term radiological and proliferation hazards.

Therefore, sufficient motivation exists for eventual destruction of the transuranics from both disassembled weapons and spent fuel: i.e., the reduction of proliferation and radiotoxicity hazards. Destruction by fission is the only means available to permanently destroy the transuranics. Although fission creates radioactive fission products which have a higher short-term hazard than the original fuel material, the fission products decay much more rapidly, so the long-term hazard is significantly reduced. Furthermore, the energy produced by the fission reactions can be converted to electrical power (the fission of 1MT of actinides yields enough energy to produce approximately 1GWe-year of electricity), and the sale of this power allows revenue recovery for the disposition activity.

In all conventional fission nuclear reactor systems, the transuranic destruction rate is mitigated by in-situ production of Pu-239 (by U-238 neutron capture). The available range of destruction/production characteristics in metal-fueled cores allows a flexible transuranic management strategy. Conventional fast reactor cores maintain or even increase the transuranic inventory (conversion ratio of 1.0–1.3); this allows sustained power production from a fixed transuranic inventory. By removing fertile material and/or altering the neutron balance, the conversion ratio can be reduced. Core designs with conversion ratios between 0.5 and 1.0 have been investigated; further reductions in the conversion ratio would require transuranic contents greater than 30 weight percent, as previously investigated in the Integral Fast Reactor (IFR) metal fuels testing program. The partial burner core designs, with 0.5–1.0 conversion ratios, are referred to as conventional burner designs because they utilize conventional IFR metallic fuel alloys.

Because the minimal conversion ratio of conventional burners is 0.5, they can achieve transuranic consumption rates of roughly half the maximum value ($\frac{1}{2} \times 1$ g/MW$_t$d). To allow more rapid destruction of the transuranics, non-conventional metal fuel alloys are required; to achieve the maximum transuranic consumption rate of 1.0 g/MW$_t$d, a non-uranium fuel form is required. Preliminary neutronic investigations of non-uranium core designs (called pure burners because they achieve the maximum destruction rate) have been discussed in R. N. Hill, D. C. Wade, E. K. Fujita, and H. Khalil, "Physics Studies of Higher Actinide Consumption in an LMR." International Conference on the Physics of Reactors Marseille, France, Apr. 23–27, 1990, p.1–83; R. N. Hill, "An Evaluation of Reactivity Coefficients for Transuranic Burning Fast Reactor Designs," Transactions of the American Nuclear Society, Vol. 65, p. 450 (1992); and GE Nuclear Energy, "Plutonium Disposition Study," GEFR-00919, May 1993. However, the fuel material design properties and behavior were not investigated in any detail.

SUMMARY OF THE INVENTION

Pu—Zr and Pu—Zr—Hf alloys are proposed for maximum Pu destruction in a metal-fueled advanced liquid metal reactor (ALMR). An assessment of the expected properties of Pu—28Zr indicate that the fuel alloy should have acceptable properties and irradiation behavior. In order to achieve the maximum destruction rate, the fuel alloy can have no U-238 as does the Integral Fast Reactor (IFR) U—Pu—Zr alloy. Hf is the alloying element which provides resonance capture and reduction in burnup swing normally provided by U-238. Incorporating Hf into the fuel alloy should have no adverse impact on thermophysical properties. However, sufficient Zr is required in a Pu—Zr—Hf alloy to maintain acceptable solidus temperatures and to mitigate possible Fuel Cladding Chemical Interactions (FCCI). A fuel element composed of a Pu—Zr—Hf fuel alloy injection cast into a Hf—Zr sheath and Na-bonded to HT9 cladding is one aspect of the invention. A thermal analysis for a Pu—28Zr-fueled subassembly in Experimental Breeder Reactor-II indicates that fuel temperatures during steady state operation or unlikely transients will not exceed the approximately 1090° C. solidus temperature. Zr depletion and axial growth behavior are not expected to be of concern.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

Figure 1A:
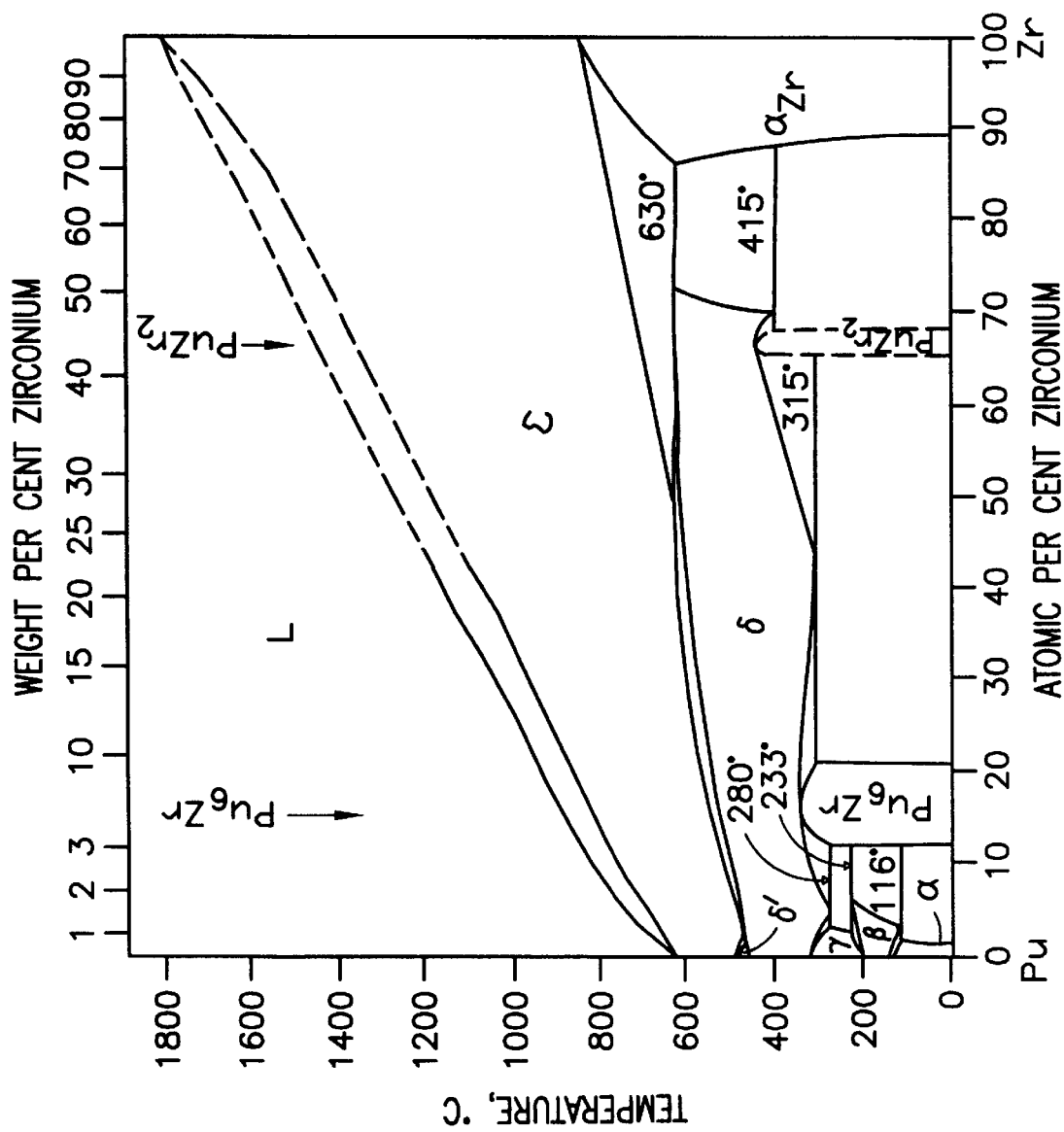
FIG. 1A shows a binary phase diagram for a Pu—Zr fuel alloy.

Zirconium was selected to be alloyed with the Pu because of the fabrication, reprocessing, and irradiation experience obtained thus far with U—Pu—Zr fuel. Zirconium is the component of the U—Pu—Zr fuel alloy that raises the alloy solidus temperature and provides resistance against fuel cladding chemical interaction (FCCI) and dimensional stability during irradiation (see G. L. Hofman and L. C. Walters, "Metallic Fast Reactor Fuels" in *Materials Science and Technology*, vol. 10A, pp. 1–43. Furthermore, the IFR pyrochemical reprocessing scheme was developed for U—Pu—Zr fuel and, thus, can accommodate Pu and Zr fuel constituents (see J. P. Ackerman, "Chemical Basis for Pyrochemical Reprocessing of Nuclear Fuel,". I&EC Research, 29, (1991), pp. 141–145).

The composition of the Pu—Zr fuel alloy was determined on the basis of desired alloy solidus and liquidus temperatures. The solidus temperature of Pu—28Zr is approximately 1090° C., which is above the peak $2\sigma$ fuel temperature for an off-normal event in a PRISM-like ALMR. PRISM is a proposed commercial ALMR design that utilizes the IFR metal fuel cycle disclosed in 1988 in Seattle, Wash. (R. C. Berglund, F. E. Tippets, L. N. Salerno, "PRISM, A Safe, Economic, and Testable Liquid Metal Fast Breeder Reactor Plant," Proc. Int'l Topical Meeting on Safety of Next Generation Power Reactors). The liquidus temperature must be sufficiently low to facilitate injection casting of fuel slugs; the Pu—28Zr liquidus temperature of approximately 1325° C. meets this criterion.

Eliminating U-238 from a fast reactor removes the component of U—Pu—Zr fuel that provides most of the negative doppler reactivity feedback and neutron absorption necessary for maintaining a sufficiently low burnup swing. Therefore, in addition to Zr, it is desirable to alloy with an element which will act as a neutron poison and compensate for these neutronic effects. Hafnium (Hf) has a large resonance capture cross-section and in the fuel system will:

1) alloy well with Pu—Zr because it is chemically similar to Zr;
2) provide negative Doppler reactivity feedback which otherwise decreases to nearly zero when the U-238 is removed from a metal-fueled core;
3) act as a fixed absorber requiring a higher plutonium inventory in the core. Because the plutonium destruction rate is fixed by the thermal power of the core, this should lead to a smaller burnup reactivity loss rate.

Hf can be incorporated into the fuel alloy, perhaps replacing some of the Zr in Pu—28Zr, and/or in a sheath that surrounds the Pu—Zr fuel slug. Incorporating Hf in the fuel alloy will provide a better coupling between the Hf Doppler feedback and fuel temperatures than would be obtained with Hf present only in the sheath. Hf and Zr have essentially the same atomic radii and very similar chemical behavior. The thermal conductivities of the two elements are essentially the same and the heat capacities are nearly the same. Therefore, the two elements should have similar effects on thermophysical properties of the fuel alloy. In addition, Hf and Zr have similar free energies of formation for many compounds (e.g. the tetrachlorides), so the two elements should behave similarly in the pyrochemical reprocessing scheme. The addition of Hf to the Pu—Zr alloy should not significantly alter the thermophysical properties of the base alloy.

Figure 1B:
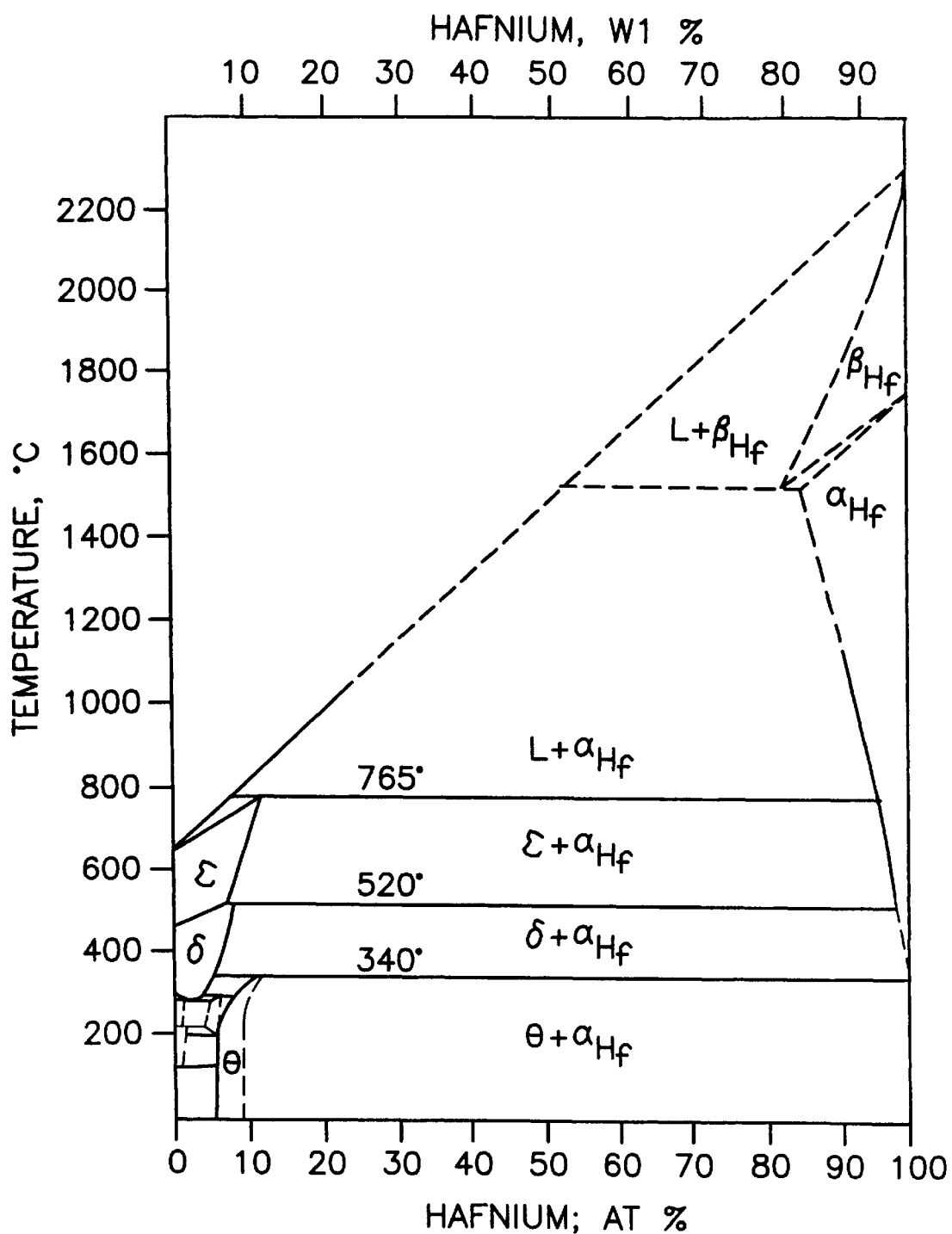
FIG. 1B shows a binary phase diagram for a Pu—Hf fuel alloy.

The Pu—Zr and Pu—Hf phase diagrams shown in FIGS. 1(a) and 1(b) indicate that the two alloy systems contain similar phases at the Pu-rich end. However, as the composition of Pu decreases, the $\alpha$-to-$\beta$ (or $\alpha_{Zr}$-to-$\epsilon$ in the Pu—Zr system) temperatures and the liquidus temperatures are higher in the Pu—Hf system than in the Pu—Zr system because the corresponding temperatures are higher for Hf than for Zr. Similarly, a Pu—28(Zr, Hf) alloy should have a higher liquidus temperature than Pu—28Zr, which will raise the temperature required for injection casting. Also, note that solubility of Hf in Pu (10 at. % in the $\delta$ and $\epsilon$ phases) is much less than that of Zr (up to 70 at. % in $\delta$-Pu and totally miscible in $\epsilon$-Pu). Because of this, Hf is not able to raise the solidus temperature of Pu—Hf as can Zr in Pu—Zr. Thus, the solidus temperature in Pu—Hf is 765° C. or less. Therefore, a Pu—Zr—Hf fuel alloy requires sufficient Zr to maintain the alloy solidus temperature at an acceptable value. Although this invention uses Pu—28(Zr, Hf) for purposes of illustration, the invention extends to other compositions also. Determining the amounts of Hf to be placed in the fuel alloy will require consideration of the Hf/Pu atom ratio required for desirable reactor performance, acceptable casting conditions, phase equilibria at operating temperatures, and alloy solidus temperatures.

Figure 2:
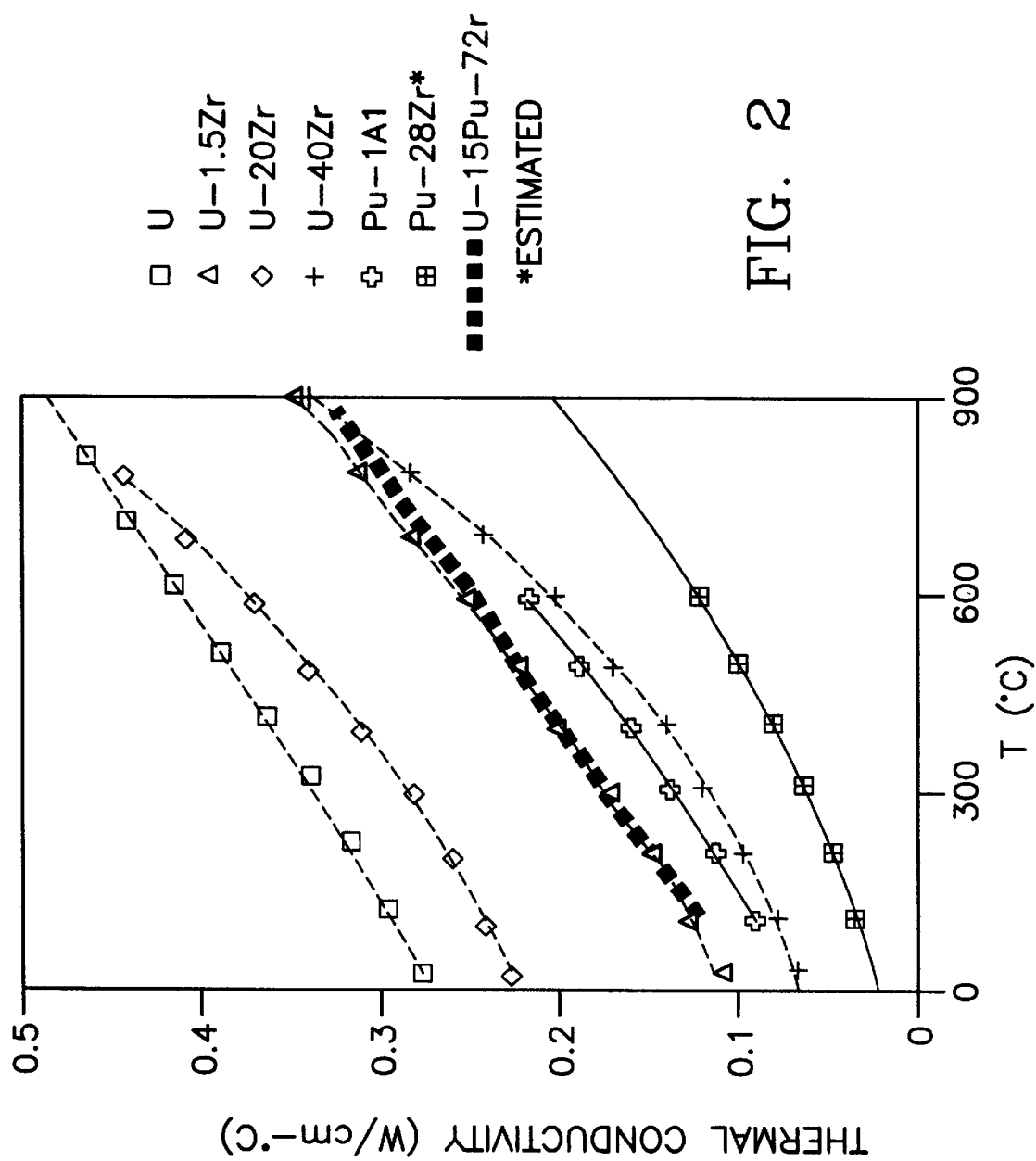
FIG. 2 shows thermal conductivities of U—Zr alloys, Pu—1A, U—15Pu—7Zr and Pu—28Zr.

To estimate the thermal conductivity, enthalpy and specific heat of Pu—28Zr, experimental data for the thermal conductivity of a variety of U—Zr alloys and for the Pu-1 wt % Al alloy were used. These data are shown in FIG. 2. The Pu—1Al alloy is delta phase-stabilized, as is expected for the Pu—28Zr alloy. The atomic radii of Zr and Al are very similar, so the thermal conductivity of Pu—1Zr was assumed to be equivalent with increasing Zr content for the U—Zr alloy and was used to extrapolate the thermal conductivity of Pu—1Zr to Pu—28Zr; This projected thermal conductivity for Pu—28Zr is shown as the lowest curve in FIG. 2. Also shown in FIG. 2 is the known thermal conductivity of the ternary alloy U—15Pu—7Zr. The thermal conductivity of U—15Pu—7Zr is similar to, but greater than, the conductivity of U—20Pu—10Zr which is routinely irradiated in EBR-II. The projected thermal conductivity of Pu—28Zr is roughly half of that of U—15Pu—7Zr at 600° C. While low for a metallic fuel alloy, initial calculations of thermal performance indicate this fuel thermal conductivity would be acceptable.

The specific heat of Pu—28Zr is needed for evaluating transient behavior of the fuel. Because no data on the thermodynamic properties of Pu—28Zr are available, the enthalpy of Pu—28Zr as a function of temperature was estimated to yield an estimate of the specific heat. The Pu—28Zr alloy was assumed to be an ideal solution, and the enthalpy of the solution was computed as the mole-fraction-weighted sum of the elemental molar enthalpies of Pu and Zr obtained from the literature. Thermodynamic data generated in this manner retains phase transition discontinuities present in the elemental specific heats that will likely not exist at different temperatures. When this procedure was applied to the estimation of the specific heat of Pu—28Zr, the calculated specific heat was fairly constant, varying from 32.1 to 34.8 J/mol-K over 375° to 1075° C. This specific heat is similar to that of the U—Zr alloys reported in the literature.

The density of Pu—28Zr can be estimated by multiplying the reported densities of δ-Pu (15.9 g/cm$^3$) and α-Zr (6.5 g/cm$^3$) by the respective atom fractions and summing, resulting in a value of 11.2 g/cm$^3$. The same method results in a value of 10.3 g/cm$^3$ for Pu—36Zr (Pu-60 at . % Zr), which agrees with a reported measured value. Hardness measurements for rolled Pu—36Zr are much less (at ~100 DPH) than for homogenized U—20Pu—10Zr (at ~420 DPH). The softness of the Pu—Zr alloy was attributed to the retained δ (FCC) phase. Because the Pu—Zr alloy is so much softer than U—Pu—Zr, it should have much less tensile strength—at least at lower temperatures. Mechanical properties at fuel operating temperatures will be more similar.

Data concerning the irradiation performance of Pu—Zr is scarce, but the general fuel performance of the Pu—Zr alloy can be inferred from experience with other metallic fuel alloys. Heavily cold-rolled specimens made of Zr-5 wt. % Pu and Zr-7 wt. % Pu were shown to have poor dimensional stability (length changes of 200–500%) under irradiation to 1.3 at . % burnup at temperatures of 410°–530° C. However, the microstructure of those specimens indicated they existed as a solid solution of Pu in α-Zr; thus, the specimens had a hexagonal close-packed crystal structure. The high amount of cold work and the anisotropic structure (inducing preferred grain orientation) are likely reasons for the dimensional instability of these alloys under irradiation. An as-cast Pu—28Zr fuel slug will exist in a non-equilibrium (at room temperature) FCC δ phase. Upon heating to reactor temperatures, the Pu—Zr phase diagram (FIG. 1a) indicates that the δ phase and the BCC ε phase of Pu and the BCC β phase of Zr) will become stable; thus the fuel will consist mainly of symmetric (cubic) phases. Such fuel will not contain the preferred orientation present in heavily cold rolled α-phase samples, so dimensional instability in Pu—28Zr fuel slugs is not expected. Reported swelling measurements of Zr-40 at . % Pu made after irradiation to 0.83 at . % burnup indicate that Pu—Zr irradiated in the delta phase is relatively stable.

Reported examination of irradiated U—Pu—Zr has revealed radial regions that are depleted and enriched in Zr as compared to the as-cast composition. If Zr depleted fuel material contacts cladding material, then enhanced interdiffusion of fuel and cladding constituents may result. In addition, fuel regions enriched in Pu may experience locally high power density and, thus, locally high temperatures; a reduction in Zr would also lower the solidus temperature in that region of the fuel, reducing the margin to onset of fuel melting. According to the model presently used to explain this behavior, differences in Zr solubility (along the temperature gradient) in the matrix phase of multi-phase zones provide the driving force for Zr migration into the γ phase region in the center of the fuel pin, see D. L. Porter, C. E. Lahm, and R. G. Pahl, "Fuel Constituent Redistribution during the Early Stages of U—Pu—Zr Irradiation," Met. Trans. A. 21A, (1990), pp. 1871–1876. The phase diagram in FIG. 1a shows that Pu—28Zr will have no such multi-phase zones (except for, perhaps, a very small region of ε+δ), so the current model would predict no Pu or Zr migration.

The Pu—Hf phase diagram (FIG. 1b) also indicates that, in accordance with the current model as discussed above, Pu—Hf alloys are vulnerable to Hf migration which could lead to Pu-enriched regions of the fuel. The δ and ε phases of Pu—Hf form the matrix for Hf compositions less than about 50 at. %, and these phases have increasing solubility of Hf with temperature. Thus, a Hf concentration (i.e. activity) gradient is established across the radius of the fuel element after it attains operating temperatures. It is believed that Hf would diffuse down the concentration gradient, dissolving α-Hf in the higher temperature portion of the matrix phase and precipitating α-Hf in the lower temperature portion. This would deplete the high temperature region of the fuel slug (the center) of Hf and enrich the low temperature region. Should it be found that Hf does migrate radially, but Zr does not, then the retained Zr in the Hf-depleted regions will maintain a sufficiently high solidus temperature.

The design of the proposed fuel element was guided by three important criteria. First, the dimensions of the fuel element should resemble those of the reference ALMR U—Pu—Zr fuel as much as possible. Second, the Pu content of the proposed fuel element should be similar to that of the reference. Third, fabrication techniques for the Pu-burning fuel elements should be very similar to those for the reference elements. Meeting these criteria will facilitate conversion of an ALMR from a conventional fuel design to that of a pure burner or vice versa.

As discussed, Pu—Zr—Hf must contain enough dissolved Zr to maintain a high solidus temperature. Thus, Hf cannot displace a large amount of Zr from the base Pu—28Zr alloy, nor can it displace much Pu if the fuel is to maintain power densities similar to those of U—Pu—Zr fuels. To incorporate additional Hf into the fuel element, a Hf—Zr sheath around the fuel alloy is proposed, see FIG. 3. The Pu—Zr (or Pu—Zr—Hf) fuel alloy 10 is injection cast into Hf—Zr molds 15 that will remain intact with the fuel slug 10. The sheathed-fuel will eliminate disposable quartz mold waste and should reduce axial fuel swelling to values less than would be obtained with unsheathed fuel, reducing that component of the burnup reactivity swing during a reactor cycle. The molds 15 are separated from the cladding 20 by an alkali metal 25, such as Na. By way of example, the fuel slug 10 may have an inner core O.D. of 0.127 inches or an outer core O.D. of 0.139". The sheath/mold may have an O.D. of 0.216" and inner core I.D. of 0.127" and outer core I.D. of 0.139". The fuel slug 10 may be Pu—28Zr % or Pu—28(Zr, Hf) or other alloys of Pu, Zr and Hf. Generally Hf should be present in an amount not greater than 10% by weight of the combined amount of Pu, Zr, Hf in the fuel and sheath combined. Alternatively, the fuel slug 10 can be Pu, Zr and the sheath 15 can be Hf—Zr, where Hf may be 74 wt % and Zr 26 wt %. The actual sheath inner diameter (or fuel slug outer diameter) and Hf contents of the fuel and sheath will be determined from neutronics calculations known to those of ordinary skill in this art that determine the Hf/Pu atom ratio necessary for desirable reactor performance. The sheath outer diameter and cladding 20 inner diameter shown were selected to retain the same radial plenum as conventional IFR fuel elements (which typically have a 75% smeared fuel density); this amount of radial clearance between fuel and cladding can sufficiently accommodate fuel swelling in U—Zr and U—Pu—Zr alloys.

HT9, the reference cladding for the IFR concept, is the recommended cladding material of stainless steel. HT9 has excellent swelling resistance and has exhibited good performance characteristics with U—Pu—Zr fuels. Moreover, a large performance database applicable to fast-reactor environments already exists.

The fuel can be fabricated using techniques that are currently used in the production of EBR-II fuel with remotely operated equipment similar to that which has been built for the fuel cycle demonstration in the IFR program. The fuel alloy could be melted in a vacuum induction furnace and injection cast into tubes of the Hf—Zr alloy sealed at one end. The sheathed fuel slug 10, 15 will then be sheared to length and sealed in the HT9 cladding 20 along with sodium 25 used to provide a thermal bond between fuel and cladding. Experience has shown that casting into Zr molds requires melt temperatures less than 1500° C., so the fuel alloy liquidus temperatures must be at least 150° C. below that point (i.e. about 500° C. below the melting or solidus temperature of the sheath material) to allow for superheating of the melt. The Hf—Zr phase diagram indicates that the liquidus temperature of Hf—26Zr is approximately 200° C. higher than the melting temperature of Zr, so additional margin is attained by including Hf in the sheath material. The Pu—28Zr liquidus temperature of approximately 1325° C. is sufficiently low to preclude problems with casting into Hf—Zr molds. The fuel alloy Hf content that can be successfully cast into a Hf—Zr mold will depend on the solidus temperature of the mold material and thus on the Hf content in the Hf—Zr alloy.

Figure 3:
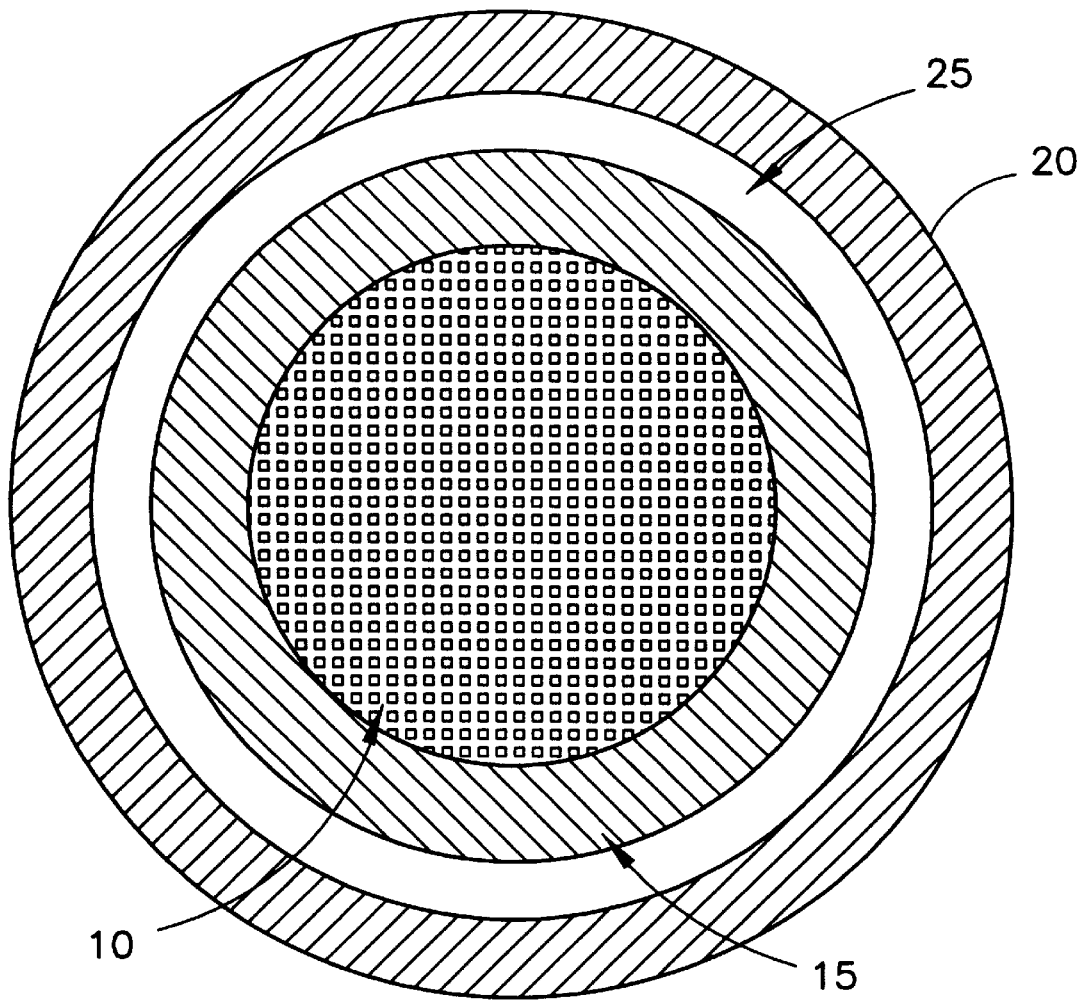
FIG. 3 is a cross-section of proposed Pu—28Zr fuel elements.

Based on the estimated thermal properties of the Pu—28Zr fuel alloy, a thermal analysis was performed for a fuel element design similar to that shown in FIG. 3. The dimensions are similar to those expected in an ALMR, except that the fuel is the standard EBR-II length of 34.3 cm (13.5 in). The fuel element is from a 37-pin experimental subassembly to be irradiated in row 4 of EBR-II designed for a total coolant flow rate of 355 liters min (94 gal/min) of sodium. The fuel element is expected to operate with a beginning-of-life (BOL) average and peak pin power of 312 W/cm and 355 W/cm, respectively (9.5 and 10.8 kW/ft).

Figure 4:
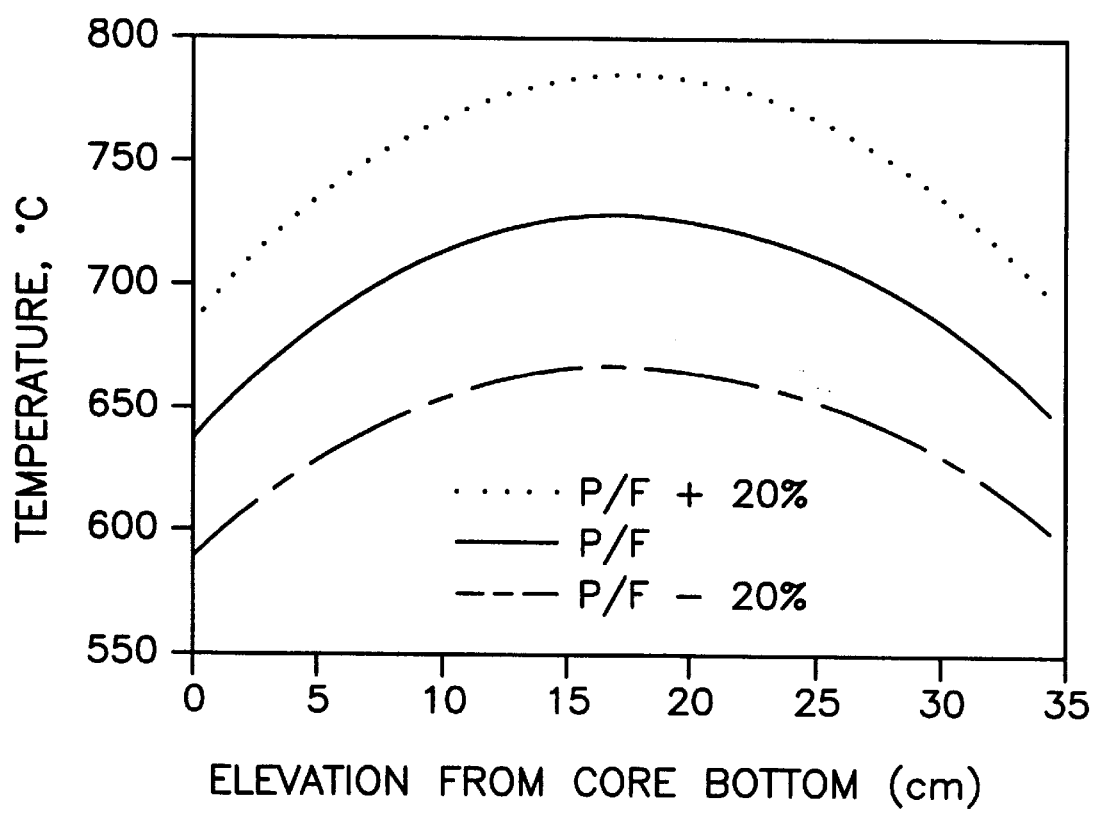
FIG. 4 shows beginning of life (BOL) fuel centerline temperatures for proposed fuel element in EBR-II irradiation.

As shown in Table 1, under the anticipated nominal conditions of pin power and subassembly flow rate, the peak fuel centerline temperature is expected to reach about 726° C., while the peak cladding temperature reaches about 477° C. Based on current experience with U—Pu—Zr fuel elements clad in HT9, neither temperature condition is considered aggressive. FIG. 4 shows how the fuel centerline temperature varies along the length of the element under the anticipated nominal conditions as well as ±20% deviations from the nominal power-to-flow ratio (P/F).

TABLE 1

Peak Temperatures from the Steady-State Analysis.

| | Peak Temperature (°C.) | | |
|---|---|---|---|
| | $P/F^a - 20\%$ | $P/F^a$ | $P/F^a + 20\%$ |
| Coolant | 439 | 455 | 472 |
| Clad O.D. | 443 | 461 | 479 |
| Clad I.D. | 455 | 477 | 498 |
| Sheath O.D. | 461 | 484 | 507 |
| Sheat I.D. | 516 | 551 | 587 |
| Fuel Center | 665 | 726 | 785 |

Figure 5:
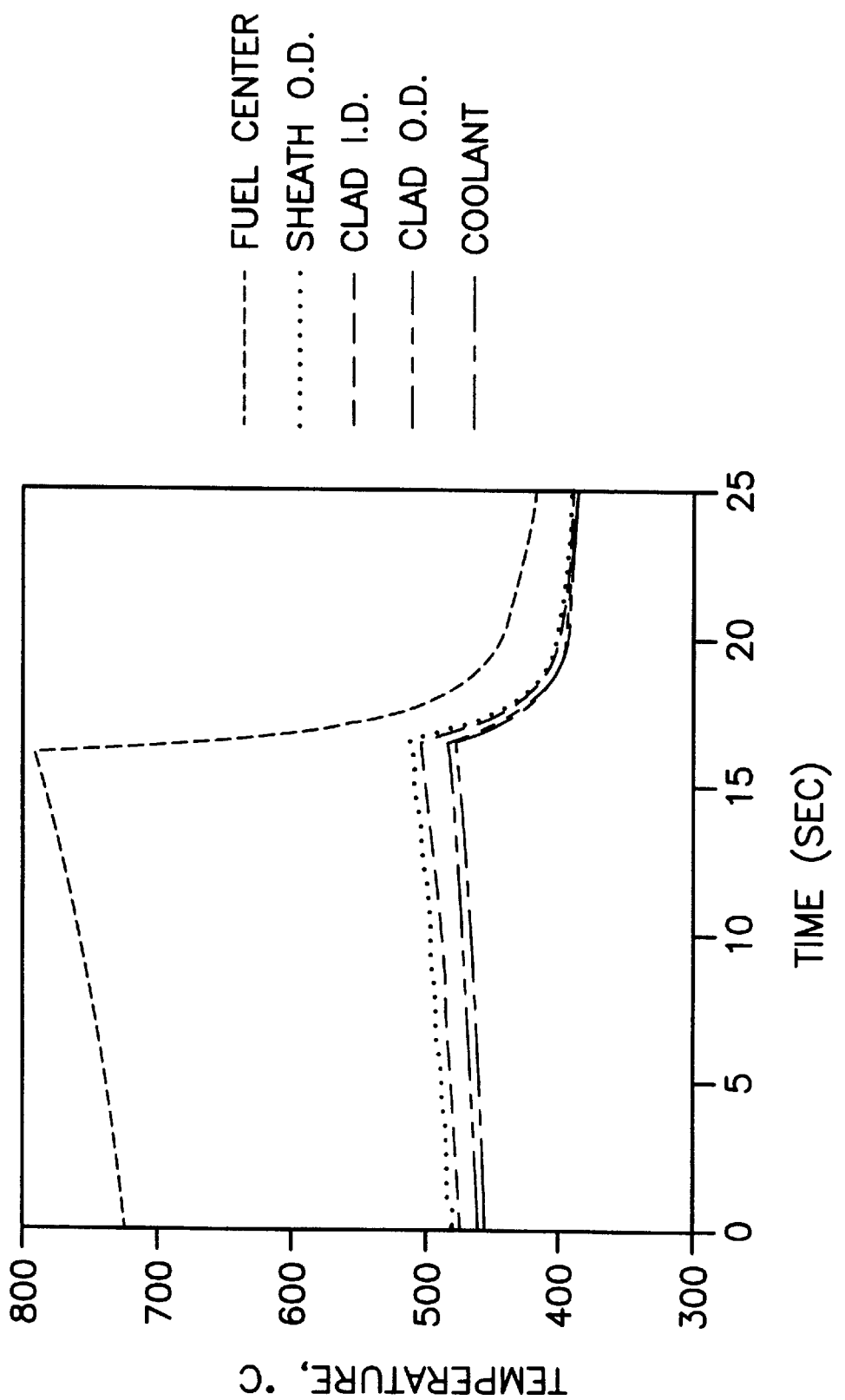
FIG. 5 shows a transient response for the proposed fuel element to an unlikely reactivity insertion in EBR-II.
Figure 6:
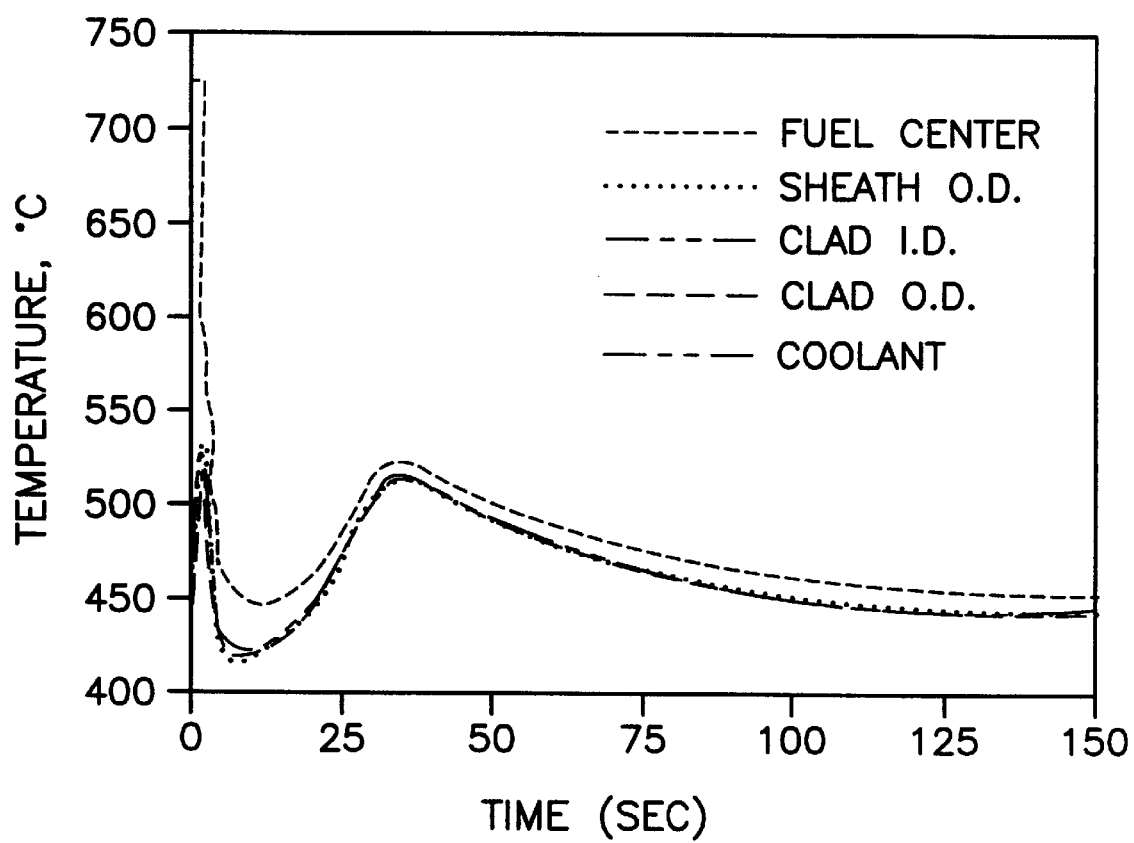
FIG. 6 shows a transient response for the proposed fuel element to an unlikely loss-of-flow in EBR-II.

Experiments in EBR-II require thermal analyses of the experiment response to both anticipated and unlikely off-normal reactor events. These include both reactivity insertion and loss-of-flow events, and the power and flow variations with time for these events have been documented for EBR-II. The transient behavior of the Pu—28Zr fuel element during unlikely reactivity insertion and unlikely loss-of-flow events in EBR-II was calculated beginning from the nominal steady-state condition and is shown in FIGS. 5 and 6, respectively. The calculations indicate that the fuel temperatures remain well below the solidus temperature of Pu—28Zr, so these off-normal events pose no safety concerns for this fuel design.

The temperature calculations shown are based on estimated thermal properties; thus, the uncertainty associated with these temperatures are unknown, but must be regarded as high. Furthermore, these calculations are for BOL conditions. During irradiation the fuel will develop porosity and undergo restructuring leading to a degradation of the fuel thermal conductivity and an increase in fuel temperatures. However, the thermal safety margin for this fuel design should be similar to that of U—20Pu—10Zr fuel currently irradiated in EBR-II. Thus, no thermal operational concerns are expected for this fuel design.

Two important aspects of fuel element performance that must be observed with this alloy are fuel-cladding chemical interaction (FCCI) and axial fuel elongation due to swelling. Interdiffusion of fuel and cladding constituents in U—Pu—Zr fuel elements clad in HT9 can result in the formation of compositions in the fuel that have lower melting temperatures than the fuel alloy itself and in the formation of interaction zones that penetrate into the cladding and are considered wastage. Such interaction can ultimately lead to premature cladding failure. However, the relatively high composition of Zr (50 at. %) should be sufficient to prevent formation of low-melting-temperature compositions of Pu and Fe (which form a eutectic near 10 at. % Pu at 410° C.) and should mitigate the penetration of fuel constituents into the cladding.

Because the Pu—Hf phase diagram indicates that Hf is much less soluble in the δ and ε phases of Pu is Zr, a Pu—28(Zr, Hf fuel alloy could have two-phase regions stable at reactor operating temperatures. If the alloy had too little Zr, then the matrix phase in some regions of the fuel would consist of δ or ε Pu with little Hf or Zr in solution. These high-Pu phases could then interact with the cladding if fuel-cladding contact occurred. So, a sufficient Zr content in Pu—Zr—Hf such as >10 wt % will be necessary to limit potential FCCI.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A uranium-free fuel for a fast nuclear reactor comprising an alloy of Pu, Zr and Hf, wherein Hf is present in an amount less than about 10% by weight of the alloy.

2. The fuel of claim 1, wherein the Pu is present as an alloy of Pu—28(Zr, Hf).

3. The fuel of claim 2, wherein the Hf is present in the range of from about 1% to about 5%.

4. The fuel of claim 1, wherein the Hf is present in the range of from about 1% to about 5%.

5. The fuel of claim 1, wherein the solidus temperature of the Pu alloy is not less than about 1000° C.

6. The fuel of claim 2, and further comprising a cladding material surrounding said fuel defining an annular area between said cladding and said Pu—28 (Zr, Hf) alloy, and an alkali metal in said annular area.

7. The fuel of claim 6, wherein said alkali metal is Na.

8. The fuel of claim 7, wherein said cladding is a stainless steel.

9. The fuel of claim 1, and further comprising a cladding material surrounding said fuel defining an annular area between said cladding and said alloy of Pu, Zr and Hf, and an alkali metal in said annular area.

10. The fuel of claim 9, wherein said alkali metal is Na and said cladding is a stainless steel.

11. A uranium-free fuel for a fast nuclear reactor comprising an alloy of Pu, an alloy of Hf and Zr surrounding said Pu alloy, a cladding spaced from and surrounding said Hf and Zr alloy defining an annulus therebetween, and a bonding material between said cladding and Hf—Zr alloy wherein Hf is present in an amount not more than 10% by wt of the combined weight of the Pu—Zr—Hf alloy.

12. The uranium-free fuel of claim 11, wherein Hf is present in an amount in the range of from about 1% to about 5% by weight of the combined weight of the Pu—Zr—Hf alloy.

13. The uranium-free fuel of claim 12, wherein the Pu alloy is a Pu—Zr alloy and this Pu—Zr alloy is Pu—28(Zr, Hf) where the Hf content of the Pu—28(Zr, Hf) and the alloy of Hf and Zr does not exceed about 10% by weight of the combined weight of the Pu—Zr—Hf alloy and the Zr—Hf alloy.

* * * * *